US008253589B2

(12) United States Patent
Grimm et al.

(10) Patent No.: US 8,253,589 B2
(45) Date of Patent: Aug. 28, 2012

(54) VEHICLE TO ENTITY COMMUNICATION

(75) Inventors: Donald K. Grimm, Utica, MI (US);
Raymond J. Kiefer, Huntington Woods, MI (US); Linda S. Angell, Grosse Pointe Farms, MI (US); Richard K. Deering, Clinton Township, MI (US); Charles A. Green, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 12/582,081

(22) Filed: Oct. 20, 2009

(65) Prior Publication Data
US 2011/0090093 A1     Apr. 21, 2011

(51) Int. Cl.
*G08G 1/00*     (2006.01)
(52) U.S. Cl. ............... 340/901; 340/539.1; 340/539.13
(58) Field of Classification Search ............... 340/539.1, 340/539.13, 517, 518, 601, 905, 990; 701/210, 701/200, 209
See application file for complete search history.

(56) References Cited

U.S. PATENT DOCUMENTS

| 6,223,125 | B1 | 4/2001 | Hall |
| 6,608,559 | B1 * | 8/2003 | Lemelson et al. ....... 340/539.13 |
| 7,095,336 | B2 | 8/2006 | Rodgers et al. |

* cited by examiner

*Primary Examiner* — Daryl Pope

(57) ABSTRACT

A vehicle to pedestrian communication system includes a vehicle-based device having a transmitter and receiver for communicating global positioning of the vehicle. The transmitter broadcasts a global position of the vehicle as part of a vehicle periodic beacon message. A pedestrian-based device is carried by a pedestrian. The pedestrian-based device has a transmitter and receiver for communicating a global position of the pedestrian as part of a pedestrian periodic beacon message. A positional awareness of the vehicle in relation to the pedestrian is assessed by at least one of the vehicle-based device or the pedestrian-based device based on the positioning of the vehicle in relation to the pedestrian. An alert is provided to at least one of the vehicle or the pedestrian indicating a presence of the vehicle or pedestrian based on the respective global positions of the pedestrian and the vehicle.

24 Claims, 4 Drawing Sheets

VEHICLE TO ENTITY COMMUNICATION

BACKGROUND OF INVENTION

An embodiment relates generally to vehicle-to-pedestrian communication.

Under certain situations, such as city traffic, vehicles must travel safely when driving in close proximity to pedestrians and pedestrians must be cognizant of the surrounding vehicles. Pedestrians are typically aware of vehicles in close proximity to them due to the sound of the running engine and tire noise such as those vehicle traveling at higher speeds. However, since vehicles are becoming increasingly quieter, pedestrians may be less likely to hear a vehicle in close proximity, particularly those traveling at slower speeds. The reduction in noise of the engine is due to enhanced noise suppression in internal combustion engines as well as the emergence of hybrid and electric vehicles. Electric vehicle may produce little or no engine or tire noise under some operating conditions (e.g., low speed). The actuation of the horn by the driver to alert pedestrians as to the presence of the vehicle, although effective, is often viewed as a rude or annoying behavior and requires manual intervention by the driver of the vehicle. In addition, cyclists are often approached and passed by vehicles traveling in a same direction and may be unaware of the vehicle approaching until the vehicle is within a close proximity to the cyclist. The beeping of a vehicle horn may further startle the cyclist causing unwanted or jerky maneuvering of the bicycle. Therefore, there exists a need to better forewarn the pedestrian on a bicycle or a walking pedestrian of the vehicle, as well as the need to better forewarn the driver of the vehicle of a presence of a pedestrian in the vicinity of the vehicle. Such needs are viewed of as particular importance to visually-impaired pedestrians that largely depend on vehicle sound cues for safe travel and wayfinding.

SUMMARY OF INVENTION

An advantage of an embodiment of the invention is effective communication for alerting the driver of the vehicle and a pedestrian of their proximity to one another. Communication is autonomously communicated between the vehicle and the pedestrian using global positioning for determining the proximity and potential interaction.

An advantage of the embodiments described herein is effective exchange of positional and heading information between a vehicle and a pedestrian for enhancing the safety awareness of the pedestrian. The embodiments described herein also provide notification and alerts as to the presence of the pedestrian to the driver of the vehicle and providing notification and alerts as to the presence of the vehicle to the pedestrian. The presence is meant to include heading, proximity, and/or other positional-related information.

An embodiment of the invention contemplates a vehicle to pedestrian communication system includes a vehicle-based device having a transmitter and receiver for communicating global positioning of the vehicle. The transmitter broadcasts a global position of the vehicle as part of a vehicle periodic beacon message. A pedestrian-based device is carried by a pedestrian. The pedestrian-based device has a transmitter and receiver for communicating a global position of the pedestrian as part of a pedestrian periodic beacon message. A positional awareness of the vehicle in relation to the pedestrian is assessed by at least one of the vehicle-based device or the pedestrian-based device based on the positioning of the vehicle in relation to the pedestrian. An alert is provided to at least one of the vehicle or the pedestrian indicating a presence of the vehicle or pedestrian based on the respective global positions of the pedestrian and the vehicle.

DETAILED DESCRIPTION

Figure 1:
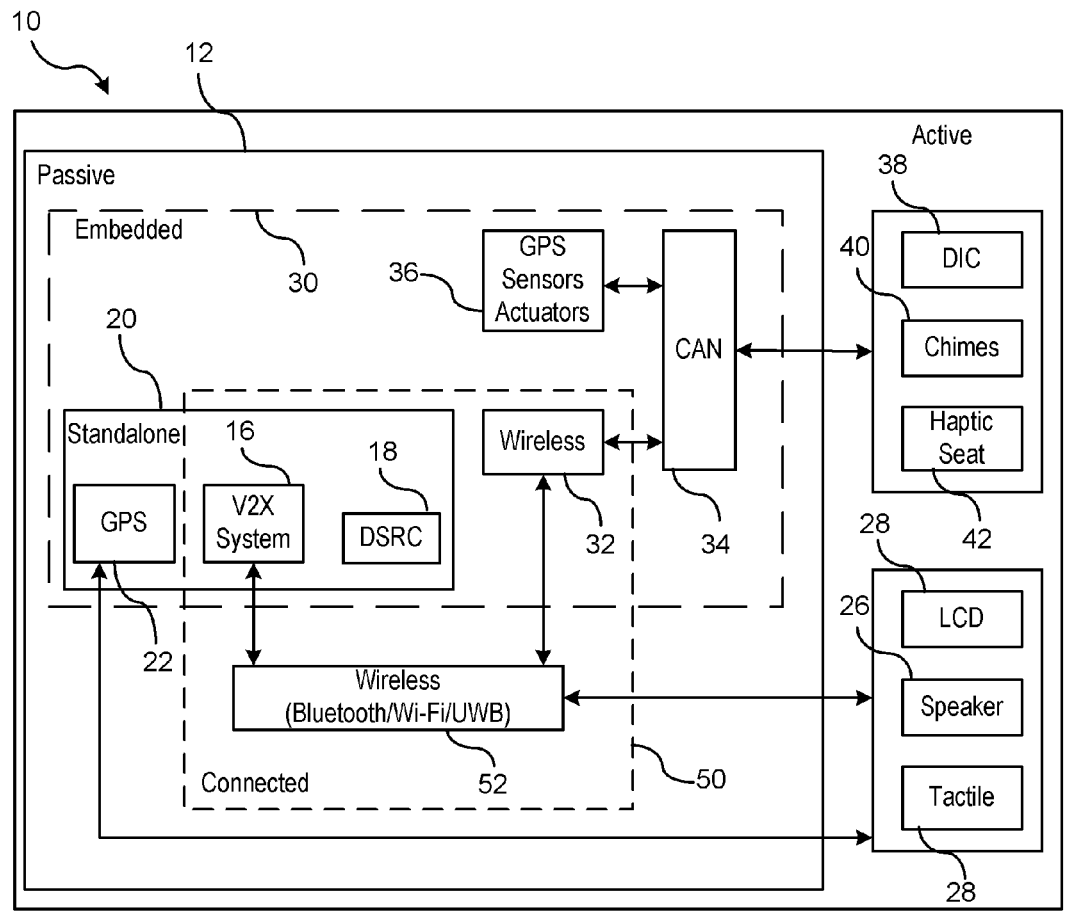
FIG. 1 is a block diagram of a vehicle-to-pedestrian (V2P) communication system.
Figure 1:
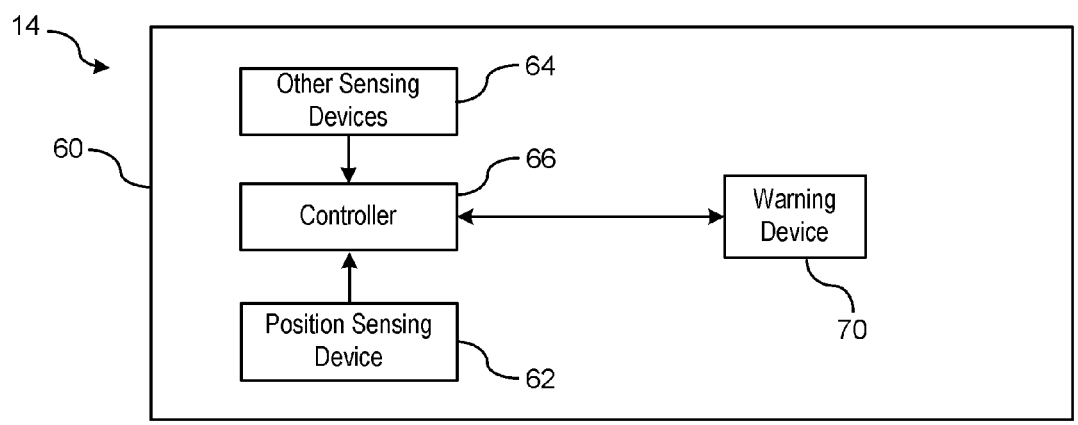

There is shown in FIG. 1 a vehicle-to-pedestrian (V2P) communication system 10. The V2P communication system 10 includes a vehicle system 12 and a pedestrian system 14 each having communication devices that autonomously communicate with one another for providing global positioning and other safety-related information for making their presence heading, proximity, or other positional-related information known to one another. It should be understood that the term pedestrian used herein includes a pedestrian standing, walking, jogging, or a person utilizing a non-automobile form of transportation (e.g., bicycle) that is positioned in the road or in close proximity to the road.

The vehicle system 12 includes a vehicle-based device 16 (e.g., a V2X communication device) for controlling the communication with the pedestrian 14. The vehicle-based device 16 includes an on-board computer. The on-board computer may be used to communicate data messages between the vehicle 12 and the pedestrian 14 via a transmitter and receiver, or similar device for receiving and transmitting data messages and files. A dedicated short range communication protocol (DSRC) 18 may be used to provide data transfer between the vehicle 12 and pedestrian 14 over a respective V2P communication network. The communication protocol may include, but is not necessarily limited to existing DSRC protocols, Wi-Fi or Bluetooth. The DSRC 18 may be used to download map data, transfer files, provide social networking, and other vehicle communications with vehicles, infrastructures, and pedestrians. The vehicle 12 may further include safety related devices and non-safety related devices coupled to the on-board computer for processing safety and non-safety related data that is transmitted to and from the vehicle 12.

A V2P wireless message may be transmitted as a standard periodic beacon message. The wireless message transmitted by the vehicle may include data about environmental awareness conditions relating to vehicle positions, vehicle kinematics/dynamic parameters (which may signify crash threat potential), traffic or road events sensed by respective remote vehicles. Likewise, the pedestrian can transmit a standard periodic beacon message identifying its location and heading. The objective is to provide advance warning to both the vehicle and the pedestrian of the proximity relative to one another so that any potential collisions may be avoided. For example, if the pedestrian is traveling around a curved portion of a road, the pedestrian may not be readily seen by a driver of the vehicle traveling around the curve until the pedestrian is in a line of sight, and it is even more difficult to see the pedestrian during darkness, low lighting conditions, or adverse weather conditions. At a point where the pedestrian becomes visible to the driver of the vehicle, and taking into consideration the speed of the driven vehicle, this may result in less than an optimal distance to react to the pedestrian. Vehicles encountering the pedestrian in the curve when provided advance warning of the pedestrian before the pedestrian is in the line of sight may allow the driver to drive more cautiously (e.g., steering away from the pedestrian) or reduce its speed in anticipation of the pedestrian. Similarly, if the pedestrian is aware of an approaching vehicle, the pedestrian may take precautionary measures, such as removing oneself from the roadway, to avoid any type of collision.

The vehicle-based device 16 and the DSRC 18 may be integrated within the vehicle 12 utilizing various architectures. The various architectures include a standalone architecture, a connected architecture, and an embedded architecture. The various architectures may also be passive systems or active systems. Passive systems do not provide any type of feedback to the user of the device, whereas an active system will provide notification or alerts to the driver of the vehicle.

In a standalone architecture, shown generally at 20, no external interfaces are required. That is, the necessary devices required to support communication and functionality between the vehicle system 12 and the pedestrian 14 b are integrated in a module. The standalone architecture includes the vehicle-based device 16, the DSRC 18, and global positioning system (GPS) device 22. If the standalone device 20 is active, then the standalone architecture 20 is capable of broadcasting vehicle location and movements to the pedestrian 14 and providing information and alerts back to the driver about the pedestrian 14. Alerts may be provided using visual techniques such as a display 24 (e.g., LED screen), using audible techniques such as a speaker 26, or using tactile techniques such as a tactile device 28.

In an embedded architecture, shown generally at 30, the vehicle-side system of the V2P communication system is installed by the original equipment manufacturer into the vehicle. The system interfaces with various components throughout the vehicle either by a wireless communication device 32 and/or by a wired communication system 34 such as a controller area network (CAN). Such components may include direct sensing components 36 such as GPS devices, position sensors, and actuators.

In an active embedded architecture, information is provided to the operator of the vehicle through the use of a visual display 38, an auditory device 40, or a haptic device 42. The information provided to the driver of the vehicle by any of the devices described herein may convey information as to the presence of the pedestrian, a pedestrian crash threat, an approaching direction of the pedestrian, and/or other positional-related information.

The visual display 38 may include a driver information center (DIC) which visually conveys information with respect to the pedestrian or pedestrians in the vicinity of the vehicle 12. The DIC may include an LCD display, a head-up display, or any other device which visually provides information regarding the pedestrian to the driver of the vehicle.

The auditory device 40 provides information conveyed to the operator of the vehicle through the use of audio output devices that includes, but is not limited to, dedicated speakers, stereo system speakers, or headphones. Acoustic techniques that include sound type, intensity, frequency, or pulses may be used to identify the presence, positional, heading, or crash potential information between a vehicle and a pedestrian. In addition, synthesized human speech may be used to convey this information. Moreover, external speakers installed remotely on the vehicle may be used to provide auditory information or warnings to the pedestrian in the proximity to the vehicle.

The haptic device 42 conveys information to the driver of the vehicle through a physical body sensation/stimulus and may be incorporated in vehicle seats, steering wheel, clothing, personal accessories, or other surfaces of a vehicle. The haptic device 42 installed into the vehicle may be based on technologies that include, but are not limited to, counterweight motors, transducers, smart materials, actuators or other electrical systems that can apply a sensation/stimulus to a person.

In a connected architecture, shown generally at 50, respective devices within the connected architecture are capable of providing the vehicle operator with a fully featured system that can take advantage of the direct sensing components 36 and other devices already installed on the vehicle 12. In the connected architecture, the vehicle-based device 16 may interface with the GPS and other sensing devices and activate the warning devices such as the LCD display device 24, the speaker 26, and the tactile device 28. The connected devices utilize a short range wireless communication link 52 within the vehicle 12 to activate the visual, audible, and tactile devices. Such communication links include, but are not limited to, Bluetooth, ZigBee, or NFC. As a result, the connected architecture utilizes existing vehicle sensing devices and output devices in order to collect, process, and broadcast both vehicle-based information and pedestrian-based information. Therefore, even an unequipped vehicle can be transformed utilizing a standalone architecture or connected architecture to provide a desirable solution toward a deployment of V2P communication systems.

The pedestrian system 14 is provided for pedestrians described earlier such as walking pedestrians, joggers, bicyclists and other persons utilizing a non-automobile form of transportation. This system may have a particular utility for visually-impaired pedestrians in the presence of quieter, as described earlier, traveling at low speeds. Similar to the vehicle system 12, the pedestrian system 14 may use a standalone architecture, an embedded architecture, or a connected architecture.

In a pedestrian standalone architecture, a pedestrian-based device 60 includes all the components needed to determine its position and heading and communicate with the vehicle 12. If the system is an active system, then a warning is provided to the pedestrian 14. In the pedestrian standalone architecture, the pedestrian-based device includes a built-in position device 62. The position device 62 may include GPS or other position-aiding sensors such as accelerometers or gyroscopes 64 for determining heading information. The information is collected and processed by a controller 66 or similar processing device. Information is broadcast and received using a transmitter and receiver or a transceiver. If a passive standalone system is used, then the pedestrian-based device 60 broadcasts its position and potentially its heading information to the vehicle 12 but does not provide feedback to the pedestrian with respect to vehicles in the vicinity of the pedestrian. In an active standalone system, the vehicle positioning and heading information is received by the pedestrian-based device 60 and a built-in warning device 70 may used to notify the pedestrian of utilizing various types of information related to a vehicle in the vicinity 12. A built-in warning device 70 may provide a visual warning, an audible warning, or a haptic warning.

In a pedestrian embedded architecture, the pedestrian-based device 60 is incorporated into the transportation device that the pedestrian is using. In the example of a bicyclist, the various devices comprising the pedestrian-based device 60 and other supporting devices could be integrated within the bicycle (e.g., by the manufacturer). The positioning sensing device 60, the controller 66, and warning device 70 are not required to be integrated within a single module; rather one or more of the individual devices may be remotely located on the bicycle with interfaces with one another via a wireless or wired communication link. The pedestrian embedded architecture, for example, can be installed by the original equipment manufacturer or by an aftermarket installer.

In a pedestrian connected architecture, the architecture uses discrete devices that communicate with each other via a short range wireless communication link. The wireless communication link can also communicate a command signal to initiate communicating information (e.g., a warning) to the pedestrian. The pedestrian connected architecture has bidirectional communication with other distributed components. The pedestrian-based device may be carried within a pocket of the pedestrian or worn by the pedestrian. For example, if an alert such as a "vehicle approaching in close proximity" is warranted, then the pedestrian-based device may transmit a signal to the warning device via the short range wireless communication link for actuating the alert.

Figure 2:
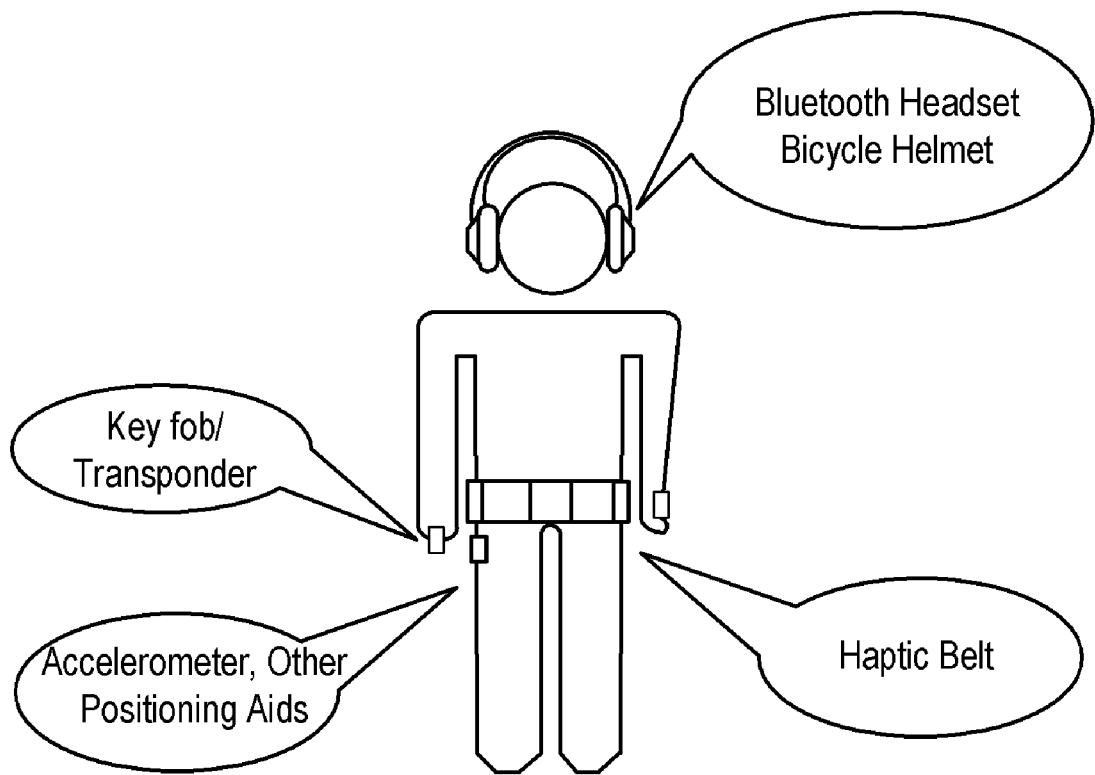
FIG. 2 is an example of a warning devices carried by a pedestrian.

The pedestrian-based device may be any portable device that can be carried on the person. The term carried is meant to include held, pocketed, attached to, or worn by the pedestrian. It would be beneficial if the portable device were one that is commonly carried on a person at all times including, but not limited to, cell phones, PDAs, wristwatch, glasses, keys, keyfobs, wallets, canes, and headphones. The warning device may include, but is not limited to, headphones, eyeglasses, and haptic clothing (e.g., belt). Examples of these devices carried on the pedestrian are shown in FIG. 2. The alert warning may be visual, audible, or haptic. Visual warnings, for example, may be generated by projecting images on to the lenses of glasses, or projecting images on to mirrors of the bicycle or the bicyclist's helmet. Similarly, headphones may be used to provide an audible warning. Information may also be communicated to the pedestrian by incorporating haptic devices into shoes, socks, anklebands, wristbands, forehead bands, undergarments, pants, belts, shirts vests, coats, hats, gloves, pants, or shorts. As for non-clothing devices, those respective device described above which the pedestrian carries at all times may be utilized for generating the haptic warning or audible warning.

Figure 3:
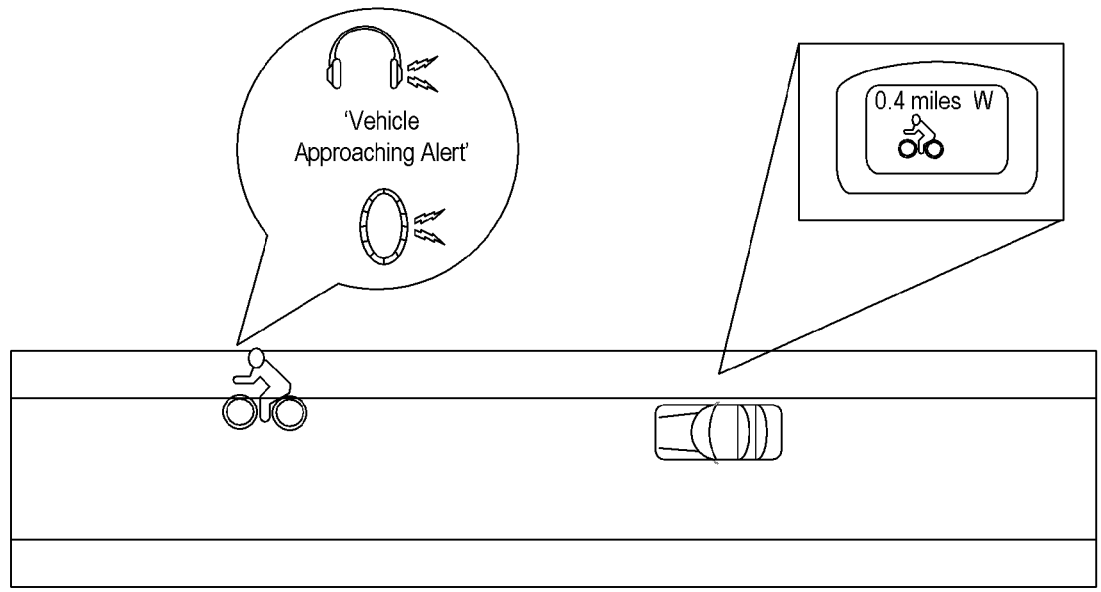
FIG. 3 is an illustration alert notification interaction between a vehicle and a pedestrian.

Information such as warnings provided to the pedestrian may be as simple as a constant alarm or a beeping or may be more complex to provide additional information such as the proximity, heading, or a detail message (e.g., "crash threat potential") of a vehicle. For example, headphones or a similar device can generate synthetic speech, or sounds can be generated that signify a respective direction for which the vehicle is approaching (e.g., sounds in one earpiece of a headphone) as is illustrated in FIG. 3. Similarly, a pedestrian may wear a haptic belt. The belt will provide a haptic alert at a location that relates to a direction of the approaching vehicle. For example, if the vehicle is approaching from the rear, then a haptic sensation is generated on the back side of the belt such that the pedestrian feels the sensation on their back. Similarly, if the vehicle is approaching from the right, then the haptic belt generates a sensation on the right side of the person's body as illustrated in FIG. 3. Similarly, the information relating to the position and heading of the pedestrian is provided to the vehicle where the location and heading can be communicated by way of visual, auditory, or haptic communication.

In the V2P communication system, the information that is communicated between the vehicle and the pedestrian includes, but is not limited to, position as determined by a GPS, proximity, approach rate, approach direction, indication of braking status and intensity, turn signal indication, estimate of roadway congestions. Information that is communicated between the infrastructure and the pedestrian includes, but is not limited to, indication of a number lanes to cross and estimated time to cross, and description of intersection geometry (e.g., curbs and islands). Moreover, a vehicle type (e.g., internal combustion engine, hybrid, electric) may be provided to the pedestrian. Although most pedestrians use both vision and hearing to determine if a vehicle is approaching or in close proximity, visually-impaired pedestrians depend upon being able to hear the vehicle. With the recent emergence of quieter vehicles (e.g., hybrid, electric, and quieter internal combustion engine vehicles), it will become increasingly difficult for people to detect if a vehicle is approaching or in close proximity by listening for vehicle sounds, particularly when traveling at low speeds. In addition, an intention by a pedestrian to perform a maneuver may be communicated by verbal requests, user initiated requests, predicted path of pedestrian, detection of pedestrian at intersection, and any gesture that indicates a desired path of travel (e.g., sensing a directional movement of a cane for a visually impaired person). Moreover, a pedestrian utilizing a cane could point the cane in a respective direction and haptic feedback may actuated in regards to any interaction with a vehicle that is approaching in the direction that the cane is pointed. It should be understood that devices other than a cane may be utilized.

Figure 4:
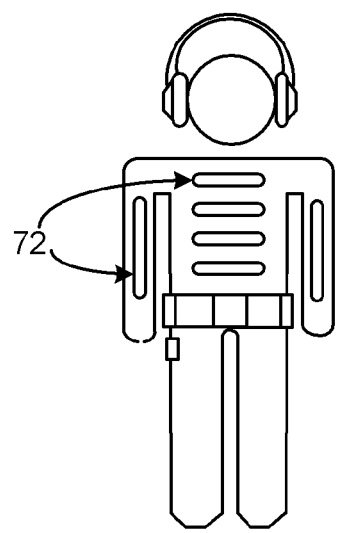
FIG. 4 is an illustration of illumination clothing worn by a pedestrian.

The V2P communication system may further help the facilitation of a driver to detect a pedestrian during darkness, low lighting, or adverse weather conditions. For example, if a V2P communication system exchanges information and a determination is made that a pedestrian is within a close proximity to the vehicle, such as a pedestrian walking, running, or riding a bicycle, then the pedestrian-based device may illuminate or flash lighting devices worn by the pedestrian for visually enhancing the pedestrian. FIG. 4 illustrates LEDs 72 embedded into the clothing and are selectively energized for visually identifying pedestrian in the dark. The selective energizing of the LEDs maintains longetivity of the power source as opposed to powering the LEDs at all times during darkness, low lighting or adverse weather conditions.

Figure 5:
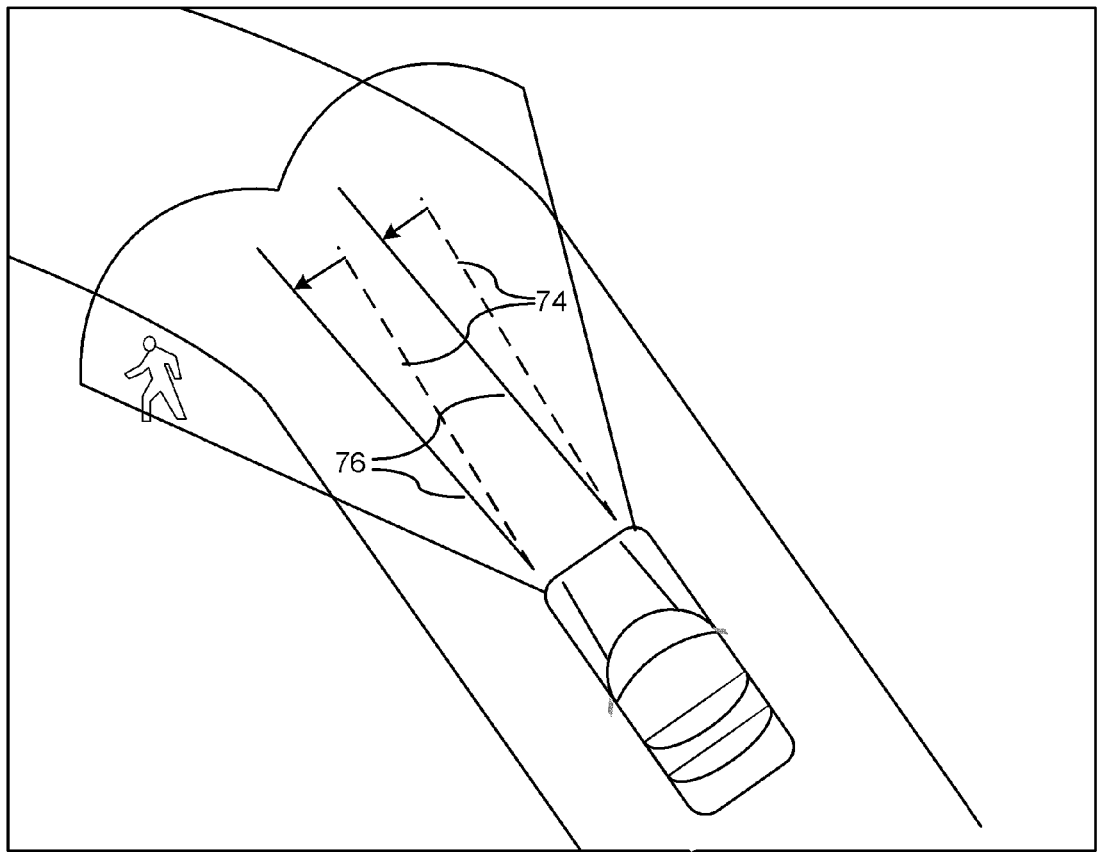
FIG. 5 is an illustration of a vehicle having steerable headlights for illuminating a pedestrian.

FIG. 5 illustrates an embodiment using steerable headlamps to assist in the facilitation of the illumination of a pedestrian which may also help alert the pedestrian. Typically automobile headlamps are focused directly forward of the vehicle as generally designated by 74. The V2P communication system assists in facilitating the use of steerable headlamps to identify the pedestrian during darkness, low lighting, or adverse weather conditions. If a pedestrian is located on a shoulder of a roadway during darkness, low lighting, or adverse weather conditions, the headlamps could be autonomously moved in a horizontal and/or vertical direction to aim and illuminate the pedestrian as generally indicated by 76. The system could either aim an individual headlamp or both headlamps at the pedestrian. Moreover, corner lamps or fog lamps can be illuminated or flashed to increase visibility in assisting the driver to visually locate the pedestrian during the nighttime.

While certain embodiments of the present invention have been described in detail, those familiar with the art to which this invention relates will recognize various alternative designs and embodiments for practicing the invention as defined by the following claims.

What is claimed is:

1. A vehicle to pedestrian communication system comprising:
   a vehicle-based device having a transmitter and receiver for communicating global positioning of the vehicle, the transmitter broadcasting a global position of the vehicle as part of a vehicle periodic beacon message;
   a pedestrian-based device carried by a pedestrian, the pedestrian-based device having a transmitter and receiver for communicating a global position of the pedestrian as part of a pedestrian periodic beacon message;
   wherein a positional awareness of the vehicle in relation to the pedestrian is assessed by at least one of the vehicle-based device or the pedestrian-based device based on the positioning of the vehicle in relation to the pedestrian, and wherein an alert is provided to at least one of the vehicle or the pedestrian indicating a presence of the vehicle or pedestrian based on the respective global positions of the pedestrian and the vehicle.

2. The system of claim 1 wherein the vehicle-based device includes a position-determining device for determining the global position of the vehicle.

3. The system of claim 1 wherein the vehicle comprises a position-determining device for providing global positioning data to the vehicle-based device.

4. The system of claim 3 further comprising a short range wireless communication link for communicating between the position-determining device and the vehicle-based device.

5. The system of claim 1 wherein the pedestrian-based device includes a positioning device for determining the global position of the pedestrian.

6. The system of claim 1 further comprising an output device for providing pedestrian information to a driver of the vehicle.

7. The system of claim 6 wherein the output device is integrated in the vehicle-based device.

8. The system of claim 1 wherein the pedestrian-based device is integrated within a portable convenience device.

9. The system of claim 8 wherein the portable convenience device is a cell phone.

10. The system of claim 8 wherein the portable convenience device is a key fob.

11. The system of claim 1 further comprising a warning device for providing vehicle awareness to the pedestrian.

12. The system of claim 11 wherein the warning device is integrated within the pedestrian-based device.

13. The system of claim 11 wherein the warning device provides safety related warnings to the pedestrian.

14. The system of claim 11 wherein the safety related warnings to the pedestrian include potential collision warnings.

15. The system of claim 11 wherein the warning device is remote from the pedestrian-based device, the pedestrian-based device communicating with the warning device via a short range wireless communication link.

16. The system of claim 11 wherein the warning device is a haptic belt.

17. The system of claim 16 wherein the haptic belt indicates a direction of the approaching vehicle.

18. The system of claim 11 wherein the warning device is integrated within a walking cane.

19. The system of claim 11 wherein the warning device is integrated within a cycling helmet.

20. The system of claim 11 wherein the warning device is integrated within clothing of the pedestrian.

21. The system of claim 11 wherein the warning device includes a lighting device, wherein the warning device simultaneously alerts a driver of a vehicle as to the presence of the pedestrian.

22. The system of claim 11 wherein a warning device includes directional lighting, wherein at least one headlamp is moved to illuminate a communicating pedestrian.

23. The system of claim 1 wherein the vehicle-based device communicates an approaching direction and approaching rate of the vehicle to the pedestrian-based device.

24. The system of claim 1 wherein a signal is communicated from the pedestrian-based device to the vehicle-based device indicating an intention by the pedestrian to cross a road at a respective location.

* * * * *